United States Patent [19]

Fuxelius

[11] 4,333,726

[45] Jun. 8, 1982

[54] WATER BARRIER FLOTATION CURTAIN

[75] Inventor: Kaj O. H. Fuxelius, Billingsfors, Sweden

[73] Assignee: Billingsfors Bruks Aktiebolag, Billingsfors, Sweden

[21] Appl. No.: 795,806

[22] Filed: May 11, 1977

Related U.S. Application Data

[63] Continuation of Ser. No. 641,504, Dec. 17, 1975, abandoned.

[51] Int. Cl.³ .................................. E02B 15/04
[52] U.S. Cl. ...................................... 405/72; 405/70
[58] Field of Search .............. 61/1 F, 5; 405/63, 66, 405/70, 72

[56] References Cited

U.S. PATENT DOCUMENTS

| | | | |
|---|---|---|---|
| 3,613,376 | 10/1971 | Midby | 61/1 F |
| 3,757,526 | 9/1973 | Larsson | 61/1 F |
| 3,775,982 | 12/1973 | Lamboley | 61/1 F |
| 3,888,086 | 6/1975 | Robertson et al. | 61/1 F |
| 3,903,701 | 9/1975 | Gauch | 61/1 F |
| 4,008,575 | 2/1977 | Gallagher | 61/1 F |

*Primary Examiner*—David H. Corbin
*Attorney, Agent, or Firm*—Gordon W. Hueschen

[57] ABSTRACT

The present invention relates to a so-called water barrier flotation curtain, i.e., a device for confining floating water contaminants, particularly oil, and is more particularly concerned with a curtain of the type comprising an elongated barrier provided with floating means and sinkers or weights to maintain the curtain in an essentially vertical floating position having its upper elongated edge area positioned above water level, wherein the barrier is constructed of water-resistant paper.

8 Claims, 5 Drawing Figures

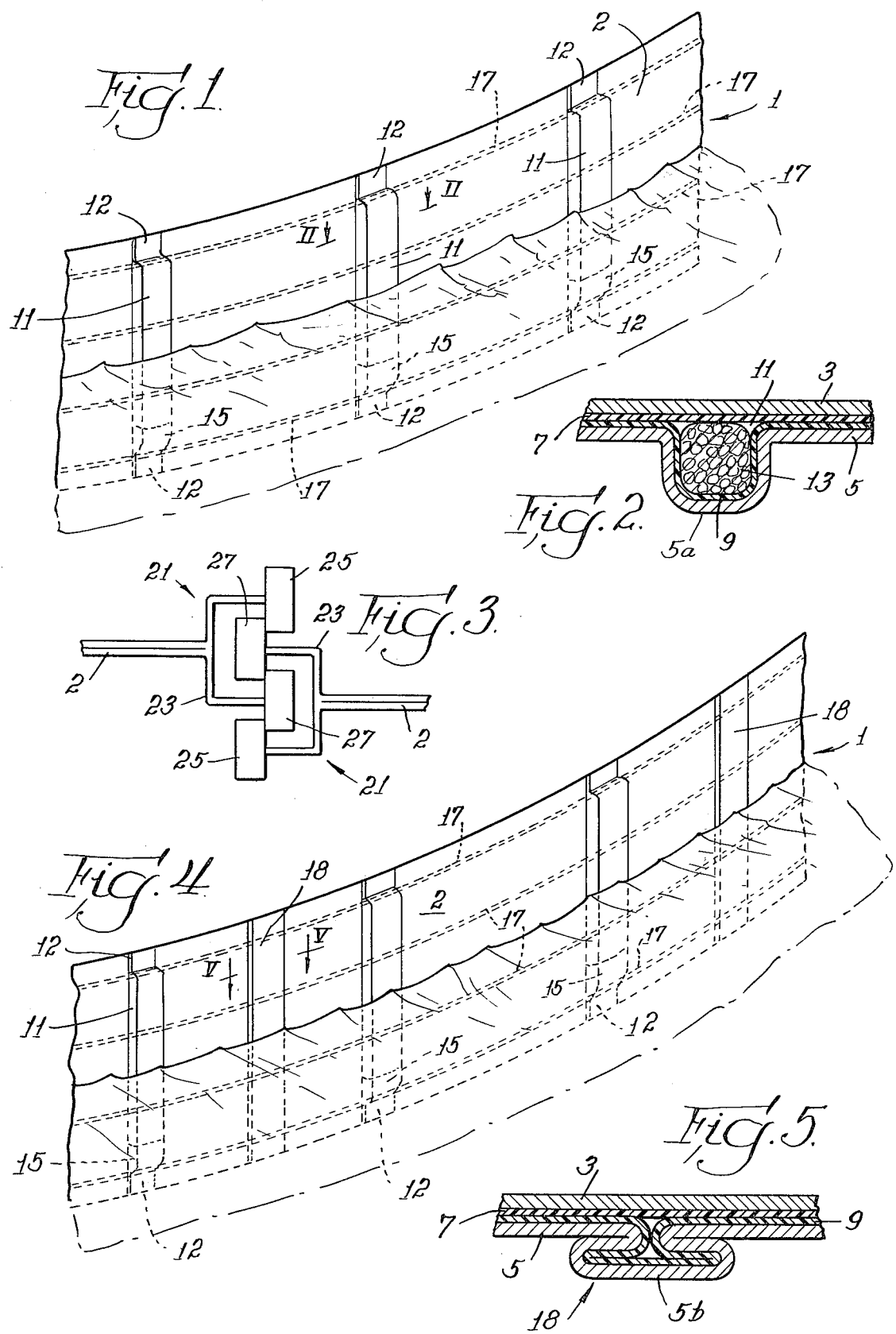

WATER BARRIER FLOTATION CURTAIN

This is a continuation of application Ser. No. 641,504, filed Dec. 17, 1975, now abandoned.

BACKGROUND OF INVENTION

(1) Field of Invention

During recent years, the demand for flotation devices for confining floating water contaminants has grown tremendously. In the first place, a basic reason is the increasingly serious environmental risk due to more and more frequent oil discharges, whether or not intentional. The ever increasing incidence of such occurrences with resultant risk to the environment along our coasts has also resulted in stricter rules as to preparedness for these environmental problems when they do occur.

The requirements placed on water barrier flotation curtains are extensive, since many aspects regarding water pollution problems and their possible solution demand consideration. Thus, it is desirable that a curtain of the type in question be easy to handle, i.e., that it have a low weight and a small volume, that it can be presented in packages, such as rolls, which are easily handled, and that it can be easily led or reeled out and assembled into desirable lengths. Moreover, it is essential that the curtain can be towed in a simple manner, that it have favorable characteristics in sea environments, and that it can be simply removed from the water after use. However, the single aspect which is perhaps most essential of all is that the curtain, after use, should be capable of being destroyed readily, preferably on the spot, without having to resort to elaborate disposal arrangements or facilities. In this respect, no satisfactory solution to the problem has hitherto been suggested.

(2) Prior Art

Water barrier flotation curtains of many different types are known. Especially during the last few years, plastic curtains have been provided in many variations. However, numerous disadvantages are associated with such plastic curtains, in that the material can be destroyed by combustion only with difficulty. Thus, the plastic material fuses in a known manner when heated, and the air oxygen required for combustion cannot obtain access to the material to the extent required for combustion. Moreover, certain plastic materials, such as polyvinyl chloride, have the tendency of releasing poisonous gases during combustion which, of course, is an essential handicap.

OBJECT OF INVENTION

It is an object of the present invention to provide a water barrier flotation curtain fulfilling the requirements indicated above and by which the disadvantages of the prior art are avoided.

SUMMARY OF INVENTION

This object, and others which will become evident as the description proceeds, are accomplished according to the present invention by means of a water barrier flotation curtain comprising an elongated barrier, provided with floating means and sinkering means balanced to maintain the curtain in an essentially vertical floating position with its upper elongated edge area positioned above water level, characterized in that the barrier is made of water-resistant paper. Thus, it has surprisingly been shown that, in spite of the stresses to which a flotation curtain is subjected in open water, various different types of water resistant papers fulfill the rigorous requirements extremely well. Moreover, it has been found that the use of wet-strength paper results in a rigidification which, in relation to known plastic materials and without resort to particular reinforcement, causes the curtain to behave in a most satisfactory way in the water.

The barrier is suitably made of wet-strength paper, particularly so-called wet-strength kraft paper being suitable. Such wet-strength papers are commonly prepared by using a resin or plastic sizing material which acts to cement the fibers together with a water-resistant bond. One may also use an exteriorly plastic-coated paper for preparation of the curtain, or a so-coated wet-strength paper.

According to a particular embodiment of the invention, the barrier is made of a single paper web, which is provided with vertical integral pockets spaced along the barrier. These pockets are closed at least at the lower end, but may, of course, also be sealed at both ends. The closure is suitably carried out by flattening and binding with a binder.

In a particularly preferred embodiment of the invention, the barrier is made of two continuous paper webs, which are laminated by means of a binder. These two paper webs are separated at intervals along the length of the barrier to provide vertical pockets sealed at least at their lower ends. In order to impart a high tensile strength to the curtain, said pockets are suitably formed by providing bulges in only one of the paper webs, whereas the other one thus extends in a straight manner.

For the purpose of improving the tear resistance of the curtain, particularly at the upper edge thereof, it is suitable to arrange at said upper edge of the curtain continuous longitudinally extending reinforcing means, for instance a cord, a plastic band, or any like material having relatively high tensile strength. Such reinforcing means, which may include more than one spaced over the vertical dimension of the curtain, may be attached by enclosure between the paper webs.

In the vertical pockets, preferably arranged at uniform intervals along the length of the curtain, floating bodies are suitably positioned. Such floating bodies may consist of bars of foam plastic, preferably polystyrene, of expanded plastic pearls, or another material, for instance bark. Polyurethane foams are also utilizable.

The sinkers or weights necessary for positioning the curtain in the water may preferably be positioned at the bottom of said vertical pockets, the floating bodies being positioned on top of the weights. The weights and floating bodies are balanced to keep the web riding vertically with a substantial portion, say about half, above the surface of the water.

DETAILED DESCRIPTION OF THE INVENTION

The invention will now be further illustrated by describing a preferred embodiment thereof in connection with the appended drawing. In the drawing:

FIG. 1 shows a part of a water barrier flotation curtain in accordance with the present invention, FIG. 2 shows an enlarged cross-section along the line II—II in FIG. 1 with the thickness of the parts being exaggerated for clarity, FIG. 3 shows a cross-section through coupling means intended for joining lengths of curtains according to the invention, FIG. 4 shows a modification of FIG. 1 with the thickness of the parts being exaggerated for clarity, and FIG. 5 shows an enlarged cross-section along the line V—V of FIG. 4.

The water barrier flotation curtain shown in FIGS. 1 and 2 and generally designated 1 has a curtain member 2 composed of two laminated paper webs 3 and 5. Said paper webs are pre-coated with polyethylene in the form of layers 7, 9, by means of which the paper webs are laminated by applying heat and pressure to the outer surfaces of the webs. At even intervals along its length the curtain is provided with vertically extending pockets 11, which, as is clear from FIG. 2, are formed in the web 5 by bulgings 5a therein, whereas the other web 3 extends in a straight manner. The pockets 11 are flattened at their ends 12, the flattening, at least at the upper edge of the curtain, being made after weight or sinker 15 and floating body 13 have been inserted into the pocket. Also, before laminating the two paper webs 3, 5, longitudinally extending reinforcing means 17 are inserted, preferably evenly distributed over the height of the curtain. In the example shown, said reinforcing means consist of four parallel cords of plastic as shown at 17. These cords are thus imbedded in the curtain by laminating of the paper webs 3, 5, carried out in connection with the manufacture of the curtain.

The curtain of the invention may be presented in uniform lengths, for instance having a length varying from 30-50 m, and said lengths may be connected in different manners when set into the water. FIG. 3 shows an embodiment of a coupling device that has been found to be useful in practice.

The coupling device shown in FIG. 3 consists of two identical parts generally designated 21 extending along the whole height of the curtain 2. Each part 21 consists of a U-shaped profile 23 which is provided with longitudinally extending ribs 25, 27 at both parallelly extending outer edges thereof. The dimensions are adjusted in such a manner that the one part may be inserted into the other in the manner as is clear from FIG. 3, whereby attachment between two lengths of the curtain of the invention will be obtained. The curtain 2 may be connected to the coupling member 21 in any suitable manner, for instance by anchoring the cords 17 thereto. The advantage of the device according to FIG. 3 in its practical use is on the one hand the fact that the ends of the lengths need not be identified, since all coupling members are identically designed; on the other hand that the device prevents leakage of for instance oil at the joint between the lengths. The coupling members 21 may be suitably made of plastic material, for instance polyethylene or the like. The height of the curtain 2 may vary between about 0.7 and 1.0 m; a particularly suitable measure being about 0.8 m.

The barrier member 2 of the curtain of this invention may be made of wet-strength treated paper, suitably kraft paper. The wet-strength treatment may be carried out with any of the conventional resins commonly used for this purpose, for instance polyethylene imide, carbamide resin, or melamine resin. The kraft paper is, in the usual manner, based on unbleached sulfate pulp and should have a wet strength exceeding about 20% of its dry strength. The surface weight may vary within broad limits and lies suitably within the range 50–250 g/m$^2$.

However, it is also possible to use other types of paper, for instance paper, as seen in the final barrier member 2, exteriorly coated with plastic, for instance polyethylene. However, from an economical point of view wet-strength treated kraft paper is preferred.

The laminating of the two paper webs in the barrier member 2 as shown in FIGS. 1 and 2 can be carried out with any suitable water-resistant binder. Many binders are known to be useful for such purpose, and it is particularly suitable to use some type of thermoplastic binder enabling joining of both paper webs under heat and pressure. Examples of suitable types are, for instance, olefin polymers such as polyethylene and polypropylene, polyamides such as nylon, and vinyl and vinylidene polymers such as polyvinyl acetate. Also, different types of natural and synthetic elastomers may be used, such as natural rubber, neoprene, etc. The amount of plastic may be varied within wide limits, for instance from 100–200 g/m$^2$ and, in the present particularly preferred embodiment, an amount of about 50 g/m$^2$ has been used.

The arrangement with regard to the pockets in accordance with FIG. 2 may be modified, in that both paper webs 3 and 5 may be bulged to the formation of a pocket composed of bulges in both webs. However, the advantage of the arrangement of FIG. 2 is the improved tensile strength of the curtain in view of the fact that one of the paper webs (3) extends in a straight manner.

In order to further stiffen the barrier 2, reinforcing ribs 18 extending parallel with the pockets 11 may be arranged at desired intervals. Said ribs may consist of flattened bulges, preferably completely flattened bulges, suitably in web 5. As shown, the bight 5b of the bulge 5a is flattened down under heat and pressure so that the polyethylene liner 9 is fused together and forms with the paper 5 an upstanding vertical reinforcing rib 18, which can be referred to as a collapsed vertical pocket.

The most pronounced advantage of the curtain of this invention is the fact that, after its use, it may be easily destroyed without leaving annoying residues. The destruction may be carried out at the place where the curtain has been used and may be brought about for instance in open barrels or the like. In view of its high paper content, even the possible plastic content of the curtain may be easily destroyed by combustion, and the problems associated with the prior art in connection with the destruction do not arise.

Among other advantages there may be mentioned the ease of handling, in that the curtain may easily be rolled into packages easy to handle, taking small space and having a low weight. In a rolled condition, each length of the curtain of the invention is so easy to handle that it may even be set out on the desired spot from a helicopter. A further advantage is the fact that the curtain of the invention may be manufactured in a very simple manner and at a relatively low cost.

When testing the curtain of the invention, it has surprisingly been found that the rigidity and the strength thereof in a moist condition are remarkably high, and that the curtain fulfills its function well, even after having been in the water for a period of up to four weeks or more.

The manner of manufacturing the curtain may be varied in many ways in practice. Thus, insertion of weights and floating bodies may be carried out before the fusing of the paper webs or after the preparation of the pockets 11, or even simultaneously with their formation, but before their sealing at the ends, at least before both ends have been sealed. As previously indicated, any floating body may be selected, and all kinds of materials, such as bark, sawdust, cork, polystyrene pearls, etc. can be used. As materials for the weights or sinkers one may advantageously use sand, which does not cause any problem whatsoever in connection with destruction of the curtain. The nature of the paper is not critical, provided only that it is water-resistant. Thus, the paper may be based on bleached or unbleached pulps of chemical, semi-chemical, and mechanical types and, among the chemical types, both sulphate and sulphite pulps are suitable.

It is to be understood that the invention is not to be limited to the exact details of operation or structure shown and described, as obvious modifications and equivalents will be apparent to one skilled in the art.

I claim:

1. A water barrier flotation curtain comprising an elongated barrier provided with floating means and sinking means balanced to maintain the curtain in an essentially vertical floating position with its upper elongated edge area positioned above water level, characterized in that the barrier is made of a longitudinally flexible, water-resistant, elongated paper web having at spaced intervals, parallel, vertical, rectangular ribs alternating with rectangular panels, said panels having a uniform thickness transversely and longitudinally and said ribs being narrow relative to said panels and said curtain being capable of being rolled upon itself into an easily handleable package; in that said web is made of two continuous paper sheets, which are laminated together with a laminating material and which at intervals, as seen in the longitudinal direction of the barrier, are separated to provide said ribs, at least some of which comprise vertical pockets which house said sinking means in the bottom portion thereof and said floating means in the top portion thereof with the sinking means and floating means being so balanced in said pockets that, without any other sinking and floating means, said barrier is maintained in the desired essentially vertical floating position with its upper elongated edge area positioned above the water level; in that said panels have a thickness determined solely by the thickness of said sheets and said laminating material; and in that some of the ribs comprise portions of said web folded back on itself into reinforcing ribs.

2. A curtain according to claim 1, characterized in that some of said ribs comprise vertical pockets flattened into reinforcing ribs.

3. A curtain according to claim 1, characterized in that said vertical pockets are formed by bulges in only one of the paper sheets, whereas the other sheet extends in a straight manner.

4. A curtain according to claim 1, characterized by a continuous, longitudinally extending reinforcing means arranged between said sheets.

5. A curtain according to claim 3, characterized by a continuous, longitudinally extending reinforcing means arranged between said sheets along and in contact with the sheet which extends in a straight manner.

6. A curtain according to claim 1, characterized in that some of said ribs comprise flattened vertical pockets held in the flattened position by said laminating material.

7. A curtain according to claim 1, characterized in that some of said ribs comprise flattened vertical pockets formed from bulges in only one of said sheets and held in the flattened position by said laminating material.

8. A curtain according to claim 2, characterized in that said flattened vertical pockets are formed by bulges in only one of the paper sheets, whereas the other sheet extends in a straight manner.

* * * * *